US006997383B2

(12) United States Patent
Kondou

(10) Patent No.: US 6,997,383 B2
(45) Date of Patent: Feb. 14, 2006

(54) ELECTRONIC VOTING SYSTEM AND METHOD OF PREVENTING UNAUTHORIZED USE OF BALLOT CARDS THEREIN

(75) Inventor: Makoto Kondou, Tokyo (JP)

(73) Assignee: NEC Corporation, Tokyo (JP)

( * ) Notice: Subject to any disclaimer, the term of this patent is extended or adjusted under 35 U.S.C. 154(b) by 190 days.

(21) Appl. No.: 10/652,921

(22) Filed: Aug. 28, 2003

(65) Prior Publication Data

US 2004/0041023 A1 Mar. 4, 2004

(30) Foreign Application Priority Data

Aug. 29, 2002 (JP) ............................ 2002-251290

(51) Int. Cl.
*G06F 17/60* (2006.01)

(52) U.S. Cl. .......................... 235/386; 705/12; 235/51

(58) Field of Classification Search ................ 235/375, 235/386, 382, 51–57; 705/12
See application file for complete search history.

(56) References Cited

U.S. PATENT DOCUMENTS 5,412,727 A * 5/1995 Drexler et al. .............. 713/186
5,610,383 A 3/1997 Chumbley
5,758,325 A * 5/1998 Lohry et al. .................. 705/12
5,878,399 A 3/1999 Peralto
6,412,692 B1 * 7/2002 Miyagawa .................. 235/382
2002/0074399 A1 6/2002 Hall et al.

FOREIGN PATENT DOCUMENTS

JP 6-251048 9/1994

* cited by examiner

*Primary Examiner*—Diane I. Lee
*Assistant Examiner*—Jamara A. Franklin
(74) *Attorney, Agent, or Firm*—Katten Muchin Rosenman LLP

(57) ABSTRACT

An electronic voting system includes a ballot card, accepting apparatus, and at least one voting apparatus. The accepting apparatus issues a ballot card in accordance with a vote acceptance request. The voting apparatus performs voting processing in accordance with a vote request using the ballot card. The accepting apparatus includes an acceptance time recording section which records the acceptance time on the ballot card when issuing the ballot card. The voting apparatus includes a timeout detecting section and unauthorized use warning display section. Before performing voting processing upon reception of a vote request, the timeout detecting section determines whether or not a preset timeout time has elapsed from the acceptance time recorded on the ballot card to the time of voting. The unauthorized use warning display section outputs a warning message when the timeout detecting section determines that the timeout time has elapsed.

24 Claims, 10 Drawing Sheets

ELECTRONIC VOTING SYSTEM AND METHOD OF PREVENTING UNAUTHORIZED USE OF BALLOT CARDS THEREIN

BACKGROUND OF THE INVENTION

The present invention relates to an electronic voting system in which voting is electronically performed by a voting apparatus using a ballot card issued by an accepting apparatus and, more particularly, to an electronic voting system having a function of preventing unauthorized use of the ballot card, a method of preventing such unauthorized use, and a recording medium storing a program.

Currently, voting in an election or the like is generally performed in the following manner. A front desk and ballot box are prepared in a polling place. In the polling place, a ballot sheet is handed to a person who has properly completed an acceptance procedure. The person then writes, on the ballot sheet, the name of a candidate for whom the person wants to vote, and casts the ballot sheet into the ballot box.

Likewise, in a polling place where acceptance and voting procedures are separately performed, a ballot card is issued, instead of a ballot sheet, to a person who has properly completed an acceptance procedure. An electronic voting system designed to perform electronic voting using such ballot cards has been proposed (see, e.g., Japanese Patent Laid-Open No. 6-251048).

The following problems, however, arise in such a conventional electronic voting system.

Assume that in the conventional electronic voting system, after a ballot card is issued to a person, the person carries it out of the polling place without voting, and hands it to the third person. In this case, if the third person enters the polling place upon properly completing an acceptance procedure, he/she can perform voting twice using his/her own ballot card and the ballot card obtained from the above person. This leads to the purchase of votes.

In addition, if voting cannot be done because of a faulty ballot card, a ballot card is reissued. In spite of fact that voting has been completed by inserting a ballot card into the voting apparatus, some person may intentionally break the ballot card and claim that he/she could not cast a vote. However, it is impossible to discriminate them.

The technique disclosed in Japanese Patent Laid-Open No. 6-251048 is based on the premise that an election administration terminal having an eligible voter database storing election information about electors including voting state information indicating an unfinished voting/finished voting state is connected, through a communication line such as a LAN, to an accepting terminal which performs an acceptance procedure by checking this eligible voter database. This reference discloses no arrangement for a case wherein an accepting apparatus designed to perform an acceptance procedure for voting is not connected to a voting apparatus designed to perform voting.

SUMMARY OF THE INVENTION

It is an object of the present invention to provide an electronic voting system which can prevent the unauthorized use of a ballot card, e.g., taking the ballot card out of a polling place and transferring it to the third person, a method of preventing the unauthorized use of a ballot card in the system, and a storage medium recording a program for preventing the unauthorized use of a ballot card.

It is another object of the present invention to provide an electronic voting system which can discriminate a case wherein voting could not be performed because of a faulty ballot card from a case wherein a voter intentionally broke or lost a ballot card and claims that he/she could not cast a vote, and prevent double voting by unauthorized reissuance of a ballot card, a method of preventing the unauthorized use of a ballot card in the system, and a storage medium recording a program for preventing the unauthorized use of a ballot card.

In order to achieve the above objects, according to the present invention, there is provided an electronic voting system comprising a ballot card, an accepting apparatus which issues a ballot card in accordance with a vote acceptance request, and at least one voting apparatus which performs voting processing in accordance with a vote request using the ballot card, wherein the accepting apparatus includes acceptance time recording means for recording acceptance time on the ballot card when issuing the ballot card, and the voting apparatus includes timeout detecting means for, before performing voting processing upon reception of a vote request, determining whether or not a preset timeout time has elapsed from the acceptance time recorded on the ballot card to the time of voting, and warning display means for outputting a warning message when the timeout detecting means determines that the timeout time has elapsed.

DESCRIPTION OF THE PREFERRED EMBODIMENTS

The first embodiment of the present invention will be described in detail next with reference to the accompanying drawings.

Figure 1:
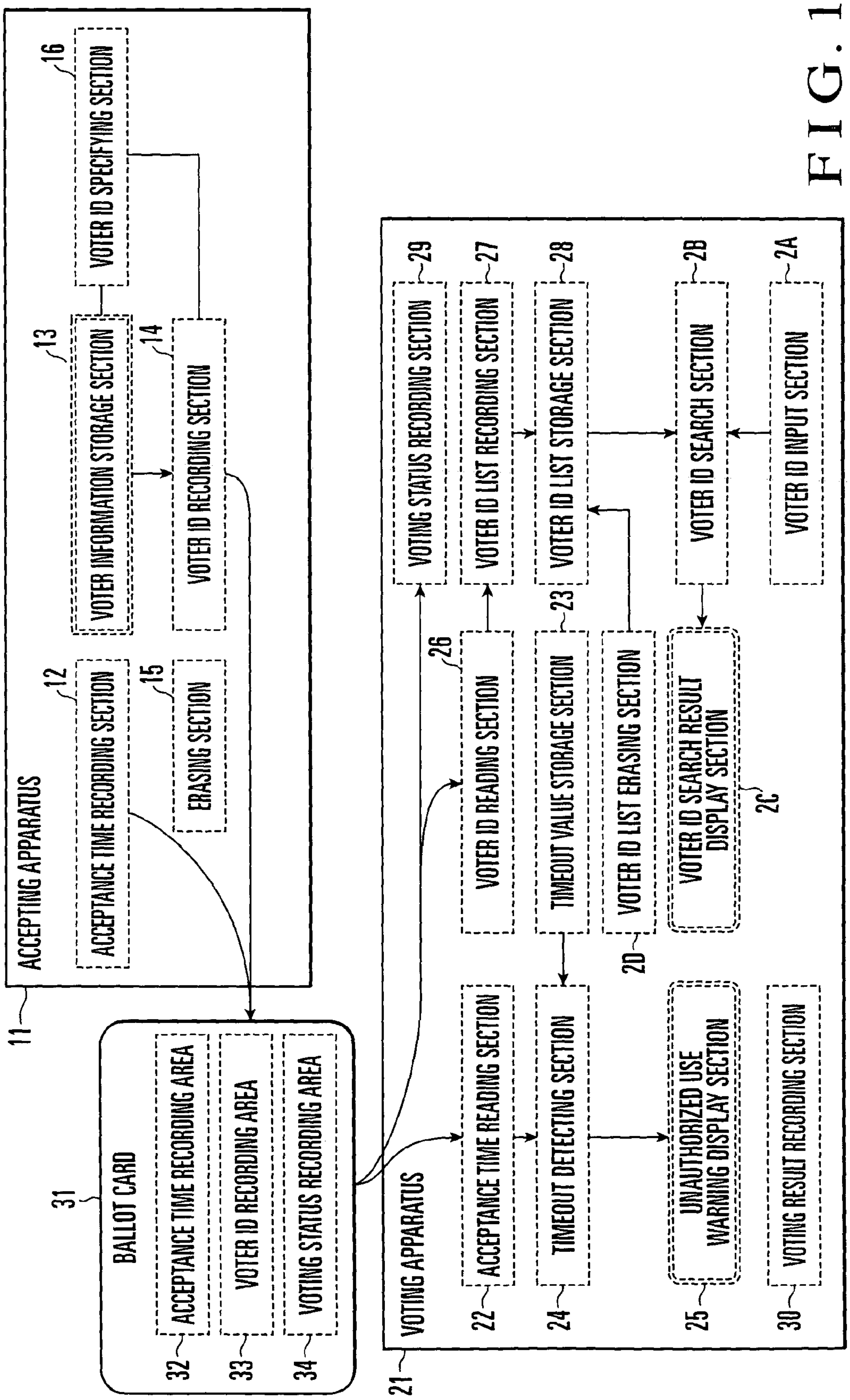
FIG. 1 is a block diagram showing the arrangement of the first embodiment of the present invention.

As shown in FIG. 1, an electronic voting system according to this embodiment is comprised of an accepting apparatus 11, voting apparatus 21, and ballot card 31.

The accepting apparatus 11 includes an acceptance time recording section 12, a voter information storage section 13, a voter ID recording section 14 connected to the voter information storage section 13, and an erasing section 15. The acceptance time recording section 12 writes the current time in an acceptance time recording area 32 of the ballot card 31 (to be described later).

On the voter information storage section 13, voter information, e.g., information (voter ID) for uniquely identifying a voter is recoded. When a ballot card (to be described later) is inserted, the voter ID recording section 14 retrieves information (voter ID) for uniquely identifying the voter who has completed an acceptance procedure from the voter information storage section 13, and writes the voter ID in a voter ID recording area 33 of the ballot card 31. The erasing section 15 erases the information recorded on a voting status recording area 34 of the ballot card 31.

The acceptance time recording section 12, voter ID recording section 14, and erasing section 15 are implemented by causing a CPU (Central Processing Unit) incorporated in the accepting apparatus 11 to load computer programs recorded on a recording medium such as a hard disk into the main memory.

Such computer programs may be loaded by directly mounting a recording medium such as a CD-ROM on which the programs are recorded in a drive unit. Alternatively, the computer programs may be downloaded through a computer network such as the Internet.

The voting apparatus 21 includes an acceptance time reading section 22, a timeout value storage section 23, a timeout detecting section 24 connected to the acceptance time reading section 22 and timeout value storage section 23, and an unauthorized use warning display section 25 connected to the timeout detecting section 24.

The voting apparatus 21 also includes a voter ID reading section 26, a voter ID list recording section 27 connected to the voter ID reading section 26, and a voter ID list storage section 28 connected to the voter ID list recording section 27.

The voting apparatus 21 further includes a voter ID input section 2A, a voter ID search section 2B connected to the voter ID list storage section 28 and voter ID input section 2A, a voter ID search result display section 2C connected to the voter ID search section 2B, a voter ID list erasing section 2D connected to the voter ID list storage section 28, and a voting status recording section 29.

When the ballot card 31 is inserted, the acceptance time reading section 22 is connected to the acceptance time recording area 32 to read the acceptance time recorded on the acceptance time recording area 32 of the ballot card 31.

Figure 2:
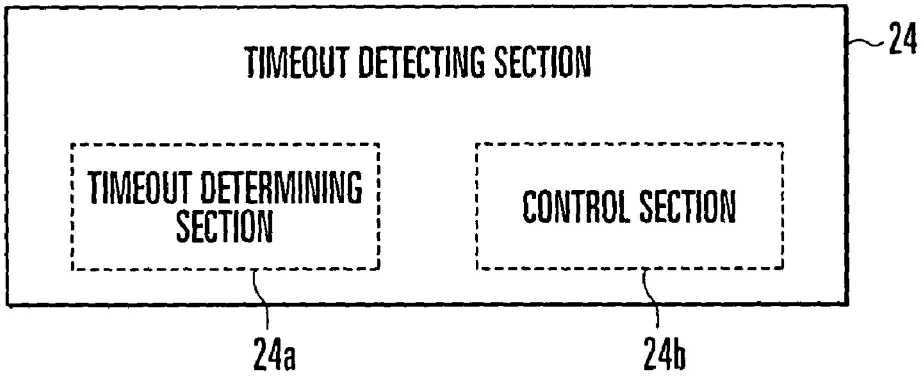
FIG. 2 is a block diagram showing a timeout detecting section in the arrangement of the first embodiment of the present invention.

As shown in FIG. 2, the timeout detecting section 24 includes a timeout determining section 24*a* and control section 24*b*. The timeout determining section 24*a* checks whether or not a timeout has occurred from the acceptance time, on the basis of the acceptance time read by the acceptance time reading section 22, the timeout value recorded on the timeout value storage section 23, and the current time. The control section 24*b* is connected to the timeout determining section 24*a* and controls, upon occurrence of a timeout, the unauthorized use warning display section 25 to output a warning message.

The timeout determining section 24*a* checks whether or not the elapsed time from the acceptance time to the current time is equal to or less than the timeout value. If the elapsed time from the acceptance time to the current time is equal to or more than the timeout value, the timeout determining section 24*a* determines that a timeout has occurred.

When the ballot card 31 is inserted, the voter ID reading section 26 is connected to the voter ID recording area 33 to read the voter ID recorded on the voter ID recording area 33. The voter ID list recording section 27 records the voter ID, read by the voter ID reading section 26, on the voter ID list storage section 28.

The voter ID search section 2B searches the voter ID list read from the voter ID list storage section 28 for the input voter ID input from the voter ID input section 2A, and displays the search result on the voter ID search result display section 2C.

If voting is normally completed, the voting status recording section 29 records information indicating completion of voting on the voting status recording area 34 of the ballot card 31. The voter ID list erasing section 2D erases the voter ID list recorded on the voter ID list storage section (28).

The functions of the respective sections described above are implemented by causing the CPU incorporated in the voting apparatus 21 to load computer programs computer programs recorded on a recording medium such as a hard disk into the main memory.

Such computer programs may be loaded by directly mounting a recording medium such as a CD-ROM on which the programs are recorded in a drive unit. Alternatively, the computer programs may be downloaded through a computer network such as the Internet. Note that the voter ID input section 2A provides a means for inputting a voter ID as a search target to the voting apparatus 21.

The ballot card 31 includes the acceptance time recording area 32, voter ID recording area 33, and voting status recording area 34. When the ballot card 31 is inserted into the accepting apparatus 11, the acceptance time recording area 32 is connected to the acceptance time recording section 12, and the acceptance time is recorded on the acceptance time recording area 32.

When the ballot card 31 is inserted into the accepting apparatus 11, the voter ID recording area 33 is connected to the voter ID recording section 14, and the voter ID is recorded on the voter ID recording area 33. On the voting status recording area 34, information indicating whether or not voting has been done by using the ballot card 31 is recorded.

Note that as the ballot card 31, various kinds of cards capable of recording information, such as a magnetic card and IC card, can be used.

The operation of the first embodiment of the present invention will be described next with reference to FIGS. 3 to 8.

Figure 3:
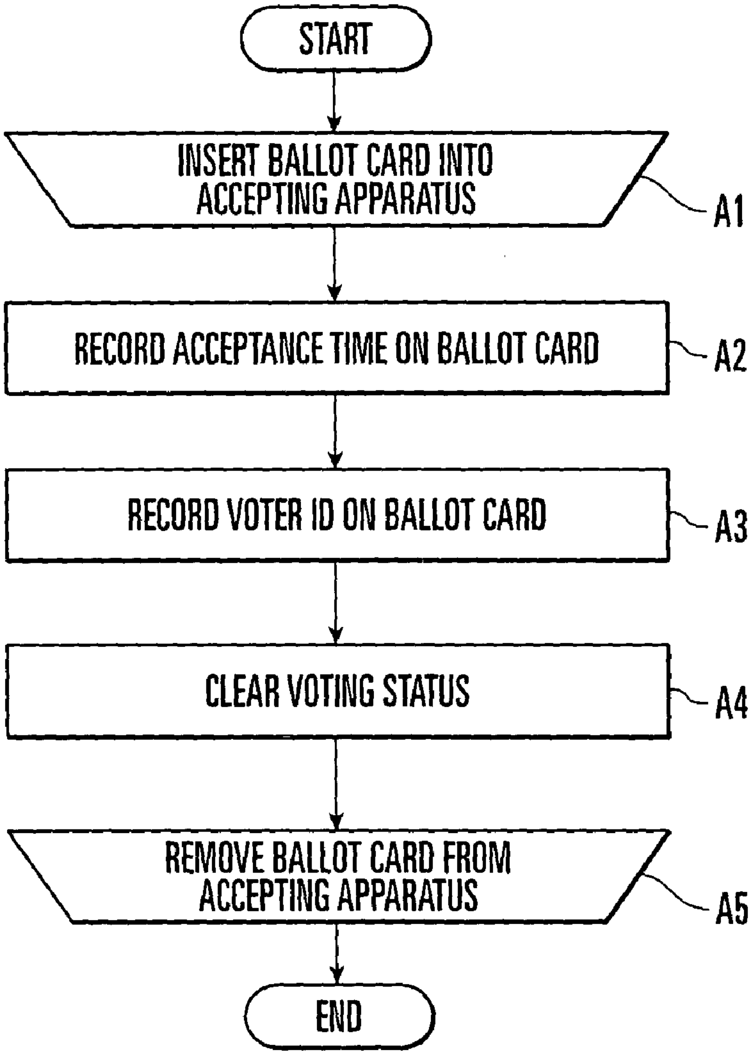
FIG. 3 is a flow chart showing operation at the time of acceptance in the first embodiment of the present invention.

FIG. 3 shows the flow of acceptance processing in the accepting apparatus 11. First of all, a voter or an attendant in a polling place inserts the ballot card 31 into the accepting apparatus 11 (step A1). As the ballot card 31, a card prepared in the polling place is used.

When the ballot card 31 is inserted, the acceptance time recording section 12 of the accepting apparatus 11 records the acceptance time on the acceptance time recording area 32 of the ballot card 31 (step A2).

The voter ID recording section 14 searches the voter information storage section 13 for the ID of the voter to be accepted, and records the corresponding ID on the voter ID recording area 33 of the ballot card 31 (step A3).

In this case, as a method of searching for voter IDs, for example, the following method is used. Vote request notifications on which bar codes are printed are sent to voters in advance. The bar code reader connected to the accepting apparatus 11 is used to read each bar code, thereby searching for the corresponding ID.

In this case, in order to cope with voters who forget to bring vote request notifications with them, the accepting apparatus 11 preferably has a function of specifying voter IDs by selecting addresses/names from a list or a function of specifying voter IDs by directly inputting addresses/names through a keyboard.

For example, a voter ID specifying section 16 having the above function is connected to the voter information storage section 13 and voter ID recording section 14. This make it possible to search for a voter ID on the basis of an input address/name and the voter information storage section 13. The voter ID recording section 14 therefore can write the voter ID in the ballot card 31.

The erasing section 15 clears the voting status recording area 34 of the ballot card 31 (step A4).

Since information indicating whether or not voting has been done by using the ballot card 31 is recorded on the voting status recording area 34, this area must be initialized at the time of acceptance. In this manner, the acceptance time and voter ID are recorded on the ballot card 31 to complete a series of operations in acceptance processing. The voter or an attendant in the polling place then removes the ballot card 31 from the accepting apparatus 11 (step A5).

Subsequently, the voter moves the voting apparatus 21 (or one of a plurality of voting apparatuses) to cast a vote.

Figure 4:
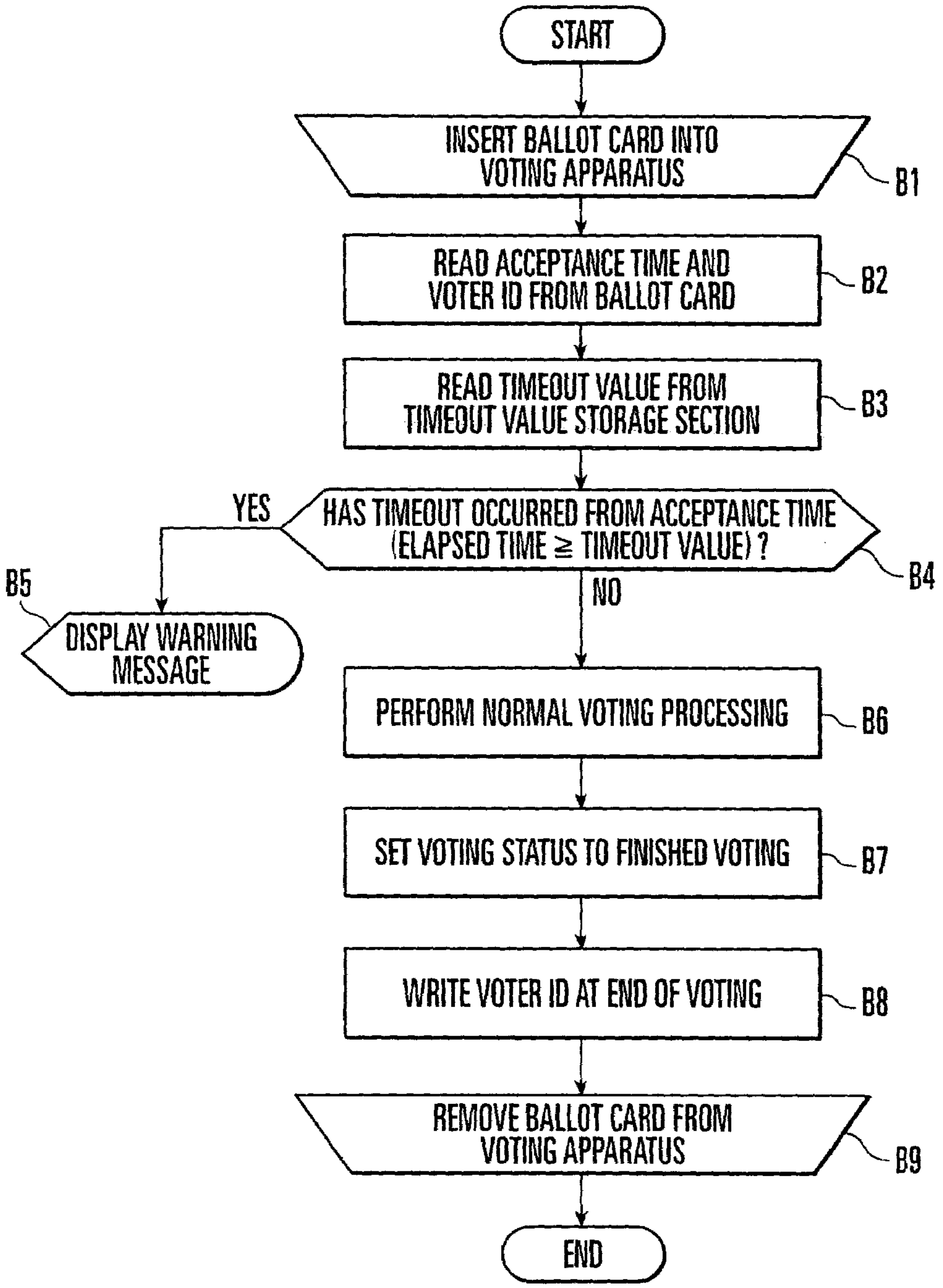
FIG. 4 is a flow chart showing operation at the time of voting in the first embodiment of the present invention.

The flow of voting processing in the voting apparatus 21 will be described with reference to FIG. 4.

First of all, the voter inserts the ballot card 31 into the voting apparatus 21 (step B1). In the voting apparatus 21, the acceptance time reading section 22 reads the acceptance time from the acceptance time recording area 32 of the ballot card 31. In addition, the voter ID reading section 26 reads the voter ID from the voter ID recording area 33 of the ballot card 31 (step B2).

The timeout detecting section 24 reads the preset timeout value from the timeout value storage section 23 (step B3).

The acceptance time read by the acceptance time reading section 22, the timeout value, and the current time are compared with each other (step B4). If the elapsed time from the acceptance time to the current time is equal to or more than the timeout value, the voting apparatus 21 displays, on the unauthorized use warning display section 25, a warning message indicating the possible unauthorized use of the ballot card 31 (step B5).

The warning message includes, for example, expressions informing the voter that an abnormally long period of time has elapsed from the acceptance procedure to voting, and the voter needs to return to the accepting apparatus 11 to check whether or not he/she is the person himself who has completed the acceptance procedure. Upon seeing this warning message, the voter returns to the accepting apparatus 11 to verify his/her identity.

It is determined as a result of comparison in step B4 that the elapsed time from the acceptance time to the current time is less than the timeout value (step B4: NO), normal voting processing is performed (step B6). When voting is normally completed, the voting status recording section 29 records, on the voting status recording area 34, voting information indicating that voting is finished (step B7).

The voter ID list recording section 27 records the voter ID read in step B2 on the voter ID list storage section 28 (step B8) The voter then removes the ballot card 31 from the voting apparatus 21 (step B9).

Operation to be performed when a warning message is displayed in step B5, and the voter returns to the accepting apparatus 11 to verify his/her identity will be described with reference to FIG. 5.

When the voter returns to the accepting apparatus 11, an attendant in the polling place acquires an address/name from the voter by inquiring, and finds the voter ID using the accepting apparatus 11 (step C1).

As described above, the accepting apparatus 11 includes the voter ID specifying section 16 having a function of specifying voter IDs by selecting addresses/names from a list or a function of specifying voter IDs by directly inputting addresses/names through a keyboard.

As described above, the voter ID specifying section 16 is connected to the voter information storage section 13 and voter ID recording section 14 to find a voter ID on the basis of an input address/name and the voter information storage section 13. The found voter ID is written on the ballot card 31 by the voter ID recording section 14.

The attendant in the polling place then receives the ballot card 31 on which the warning message is displayed from the voter and inserts the card into the accepting apparatus 11 (step C2).

The accepting apparatus 11 collates the voter ID found in step C1 with the voter ID read from the inserted ballot card 31 (step C3). That is, it is checked whether or not the voter ID found in step C1 coincides with the voter ID read from the inserted ballot card 31.

If the two voter IDs coincide with each other, it can be inferred that the ballot card 31 held by the voter was given to the voter when he/she completed an acceptance procedure by himself/herself, and the voter has nothing to do with the unauthorized use of the ballot card 31, e.g., temporarily taking the ballot card. 31 out of the polling place and transferring it to the third person.

The voter may claim that a timeout has occurred, in spite of the fact that voting has been finished, and demand reissuance of the ballot card 31. The accepting apparatus 11 therefore checks whether or not information indicating the completion of voting is recorded on the voting status recording area 34 of the ballot card 31 (step C4).

If information indicating the completion of voting is not recorded on the voting status recording area 34, the accepting apparatus 11 determines that the timeout is based on some justifiable cause, e.g., taking an abnormally long period of time from the acceptance procedure in the accepting apparatus 11 to the insertion of the ballot card 31 into the voting apparatus 21 because of congestion in the polling place, and outputs the corresponding information. With this operation, the flow returns to step A1 in FIG. 3, in which the attendant in the polling place reissues the ballot card 31 (step C5).

If it is determined in step C3 that the voter IDs do not coincide with each other, it is determined that the voter has taken part in unauthorized use of the ballot card 31, e.g., temporarily taking the ballot card 31 out of the polling place and transferring it to the third person. If it is determined in step C4 that information indicating the completion of voting is recorded on the voting status recording area 34, it is determined that this act is an illegal act of demanding reissuance of the ballot card 31 in spite of the fact that voting has been finished (step C6). In such a case, corresponding information is output, and the attendant in the polling place takes action in accordance with each situation.

Figure 5:
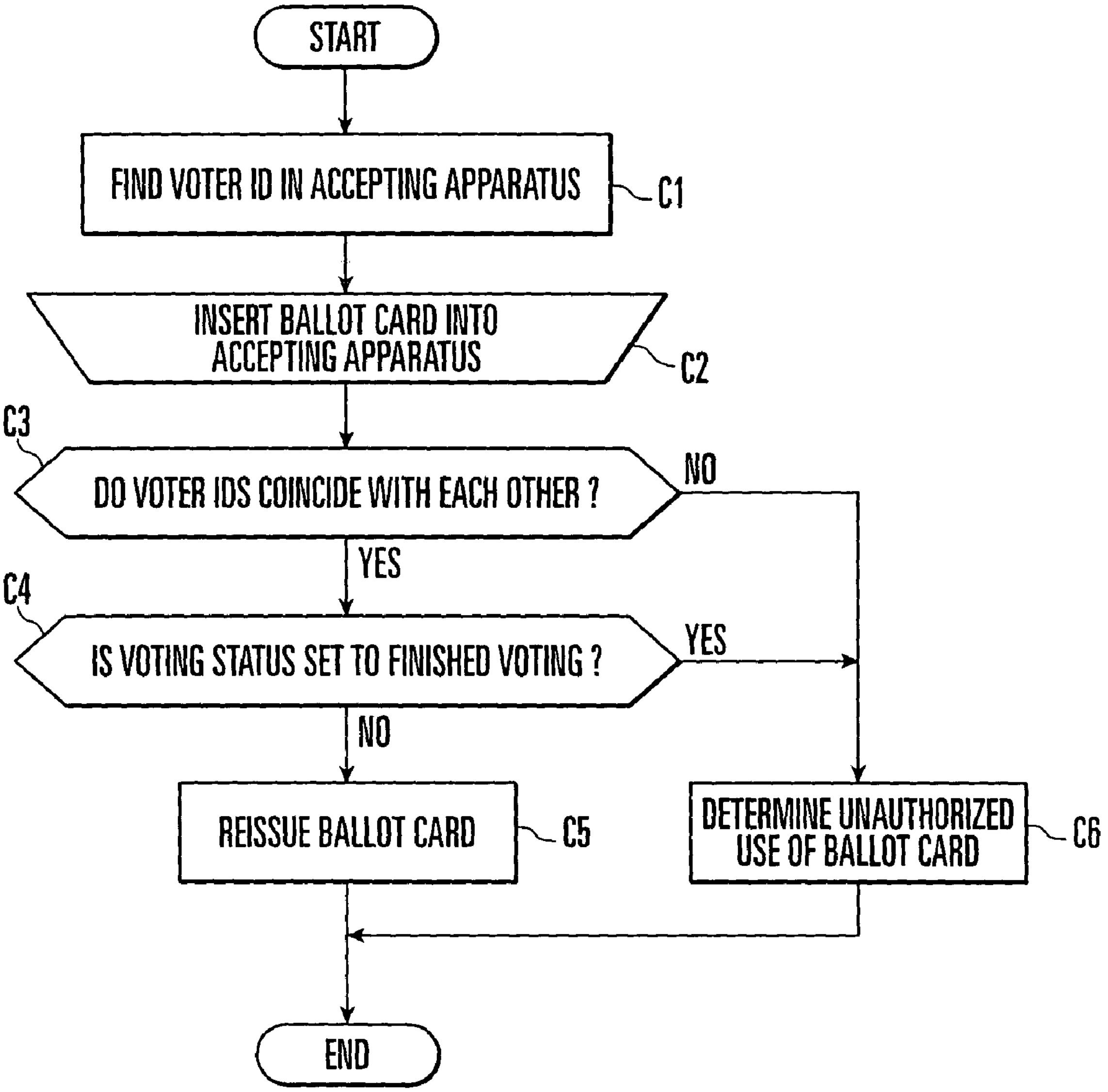
FIG. 5 is a flow chart showing operation at the time of identity verification in the first embodiment of the present invention.

Referring to FIG. 5, the processing of finding a voter ID (step C1) and the processing of inserting the ballot card 31 into the accepting apparatus 11 (step C2) can be done in an arbitrary order. In addition, the processing of checking whether or not the voter IDs coincide with each other (step C3) and the processing of checking whether or not information indicating the completion of voting is recorded on the voting status recording area 34 (step C4) can be done in an arbitrary order.

Figure 6:
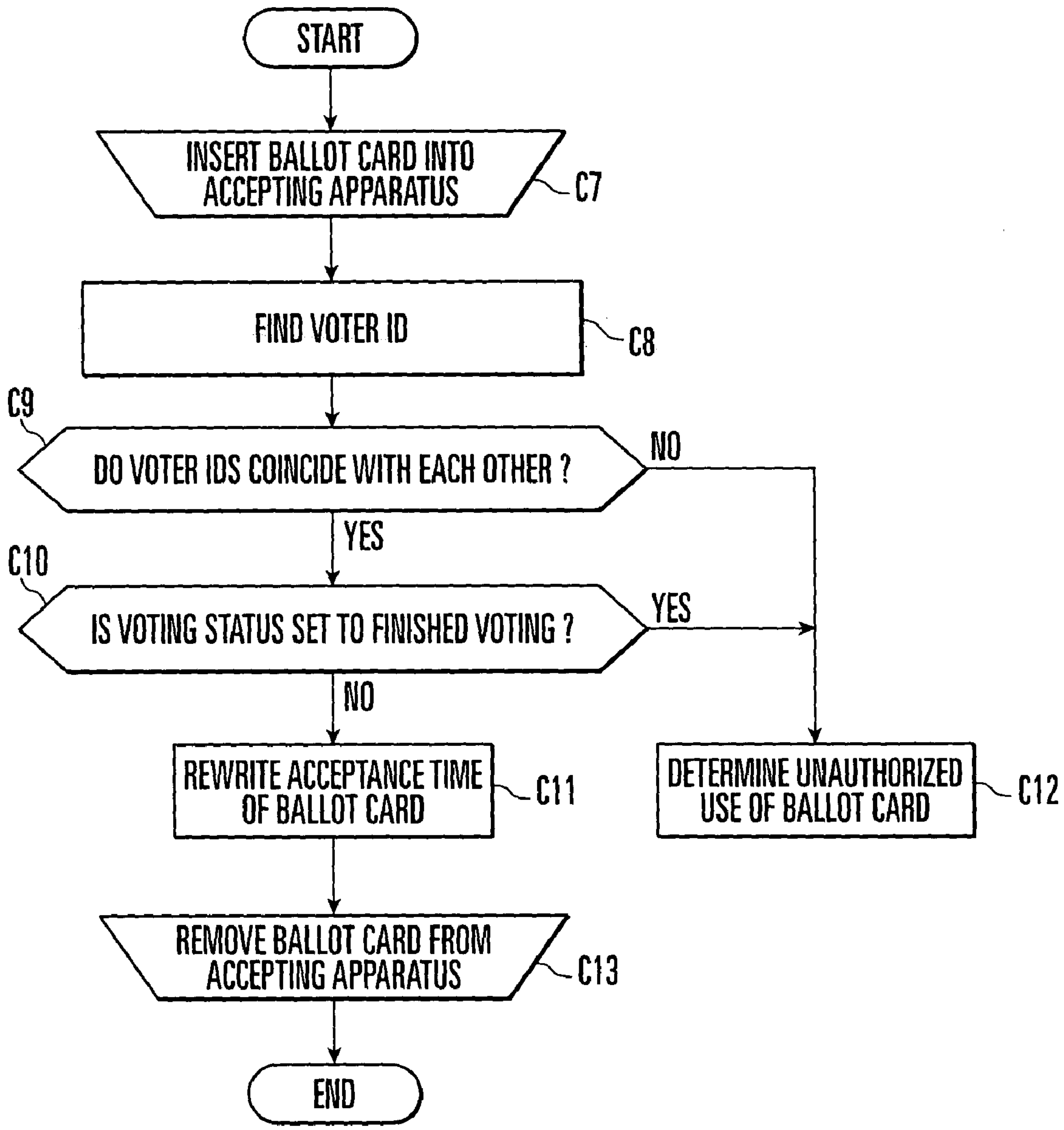
FIG. 6 is a flow chart showing operation at the time of identity verification/ballot card issuance in the first embodiment of the present invention.
Figure 7:
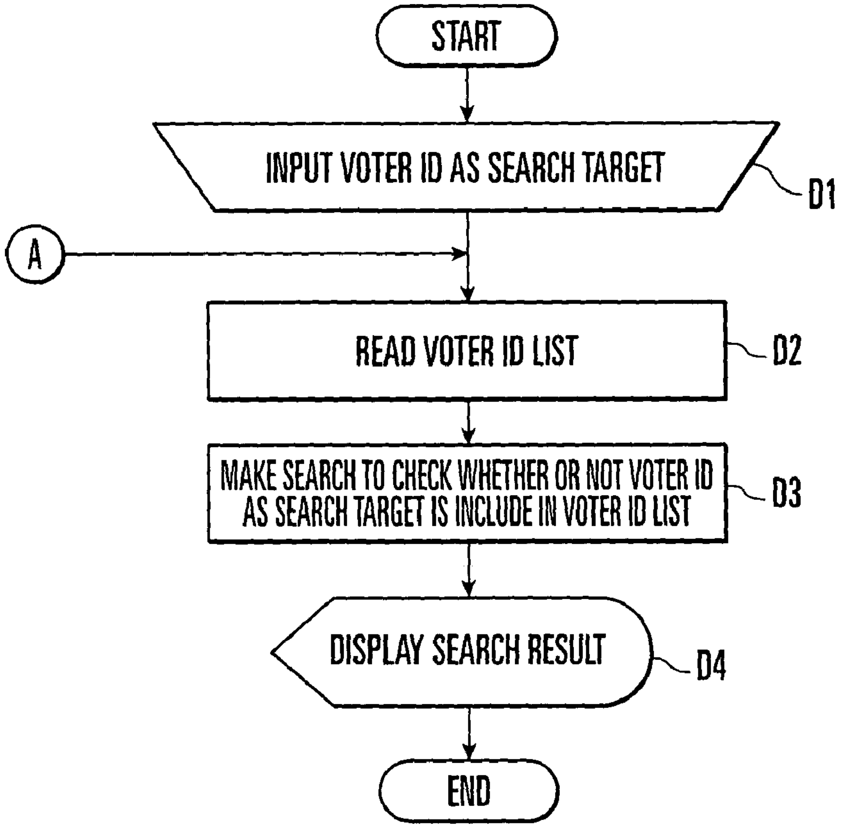
FIG. 7 is flow chart showing operation at the time of a voter ID search in the first embodiment of the present invention.

Operation to be done when a warning message is displayed in step B5, and the voter returns to the accepting apparatus 11 to verify his/her identity may also be done by the method shown in FIG. 6.

In the above method, the processing of verifying a voter's identity in FIG. 5 and the processing of reissuing the ballot card 31 in FIG. 3 when the voter's identity is verified are independently performed. In the method shown in FIG. 6, these two processes are performed in a series of operations. More specifically, when the voter returns to the accepting apparatus 11, the attendant in the polling place receives the ballot card 31 on which a warning message is displayed from the voter, and inserts it into the accepting apparatus 11 (step C7).

The attendant in the polling place acquires an address/name from the voter by inquiring, and finds the voter ID using the accepting apparatus 11 (step C8). As described above, the accepting apparatus 11 includes the voter ID specifying section 16 having a function of specifying voter IDs by selecting addresses/names from a list or a function of specifying voter IDs by directly inputting addresses/names through a keyboard. Therefore, a voter ID can be found by using the voter ID specifying section 16.

The accepting apparatus 11 collates the voter ID found in step C8 with the voter ID red from the ballot card 31 inserted in step C7 (step S9).

If the two voter IDs coincide with each other, it can be inferred that the ballot card 31 held by the voter was given to the voter when he/she completed an acceptance procedure by himself/herself, and the voter has nothing to do with the unauthorized use of the ballot card 31, e.g., temporarily taking the ballot card 31 out of the polling place and transferring it to the third person. However, the voter may be claiming that the timeout has occurred, in spite of the fact that voting has been completed, and demanding the reissuance of the ballot card 31. For this reason, the accepting apparatus 11 checks whether or not information indicating the completion of voting is recorded on the voting status recording area 34 of the ballot card 31 (step C10).

If information indicating the completion of voting is not recorded on the voting status recording area 34, the accepting apparatus 11 determines that the timeout is based on some justifiable cause, e.g., taking an abnormally long period of time from the acceptance procedure in the accepting apparatus 11 to the insertion of the ballot card 31 into the voting apparatus 21 because of congestion in the polling place. In this case, the time recorded on the acceptance time recording area 32 of the ballot card 31 is rewritten into the current time (step C11).

The ballot card 31 is then removed from the accepting apparatus 11 (step C13).

If it is determined in step C9 that the voter IDs do not coincide with each other, it is determined that the voter has taken part in unauthorized use of the ballot card 31, e.g., temporarily taking the ballot card 31 out of the polling place and transferring it to the third person. If it is determined in step C10 that information indicating the completion of voting is recorded on the voting status recording area 34, it is determined that this act is an illegal act of demanding reissuance of the ballot card 31 in spite of the fact that voting has been finished (step C12). In such a case, corresponding information is output, and the attendant in the polling place takes action in accordance with each situation.

Referring to FIG. 6, the processing of inserting the ballot card 31 into the accepting apparatus 11 (step C7) and the processing of finding a voter ID (step C8) can be done in an arbitrary order. In addition, the processing of checking whether or not the voter IDs coincide with each other (step C9) and the processing of checking whether or not information indicating the completion of voting is recorded on the voting status recording area 34 (step C10) can be done in an arbitrary order.

Furthermore, some voter may demand reissuance of the ballot card 31, claiming that voting could not be done because the ballot card 31 was broken. In order to cope with such a demand, the accepting apparatus 11 includes the voter ID specifying section 16 having the function of specifying voter IDs by selecting addresses/names from a list or the function of specifying voter IDs by directly inputting addresses/names through a keyboard, and specifies the voter ID of this person. The apparatus then checks in accordance with the flow chart of FIG. 7 whether or not the person has finished voting.

An attendant in the polling place (preferably, the superintendent in the polling place or a person designated by the superintendent) inputs the voter ID to be checked to the voting apparatus 21 by using the voter ID input section 2A. For example, the voter ID input section 2A is of a touch panel type, and has no external input device such as a keyboard unlike a general personal computer. Therefore, characters that can be input are displayed on the screen to allow the attendant to input necessary information (step D1).

The voter ID search section 2B reads out the list of recorded voter IDs from the voter ID list storage section 28 (step D2). The attendant then searches the list for voter ID as a search target input by using the voter ID input section 2A (step D3). The search result is displayed on the voter ID search result display section 2C (step D4).

If a plurality of voting apparatuses 21 are installed in the polling place, the attendant in the polling place performs such search processing with respect to all the voting apparatuses 21. The attendant permits reissuance of the ballot card 31 only when it is determined that the voter ID is not recorded on any of the voting apparatuses 21.

Figure 8:
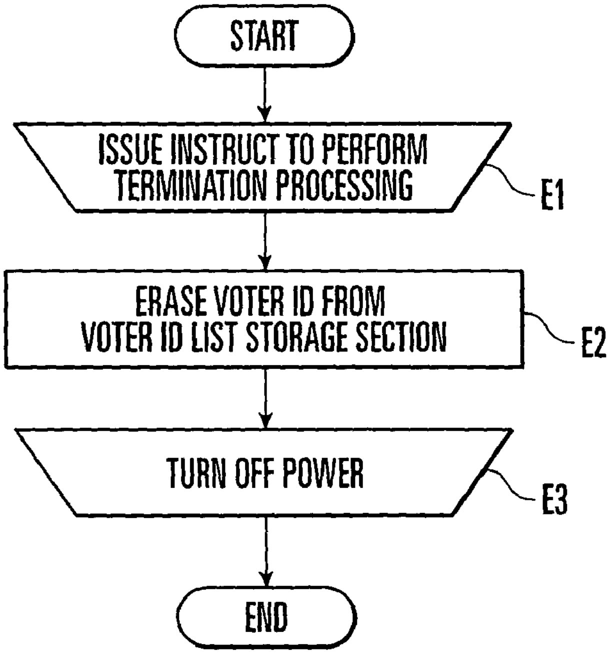
FIG. 8 is a flow chart showing operation at the time of end of electronic voting in the first embodiment of the present invention.

Electronic voting is performed until the electronic voting end time while the above processing is performed. In due time, the electronic voting end time will come. FIG. 8 shows operation to be performed when the electronic voting end time has come, and processing at the end time is performed.

The voting apparatus 21 checks whether or not an instruction to perform processing at the end time has been issued (step E1). If a termination instruction has been issued, termination processing such as digital signature on a recording medium on which voting data is stored is performed. In termination processing, the voter ID list erasing section 2D erases all the voter IDs from the voter ID list storage section 28 (step E2).

It is then checked whether or not an instruction to perform power OFF processing has been issued. If a power OFF instruction has been issued, the power is turned off (step E3).

The first embodiment of the present invention performs the operations described above. These operations will be described with reference to schematic views of FIGS. 9A and 9B.

Figure 9A:
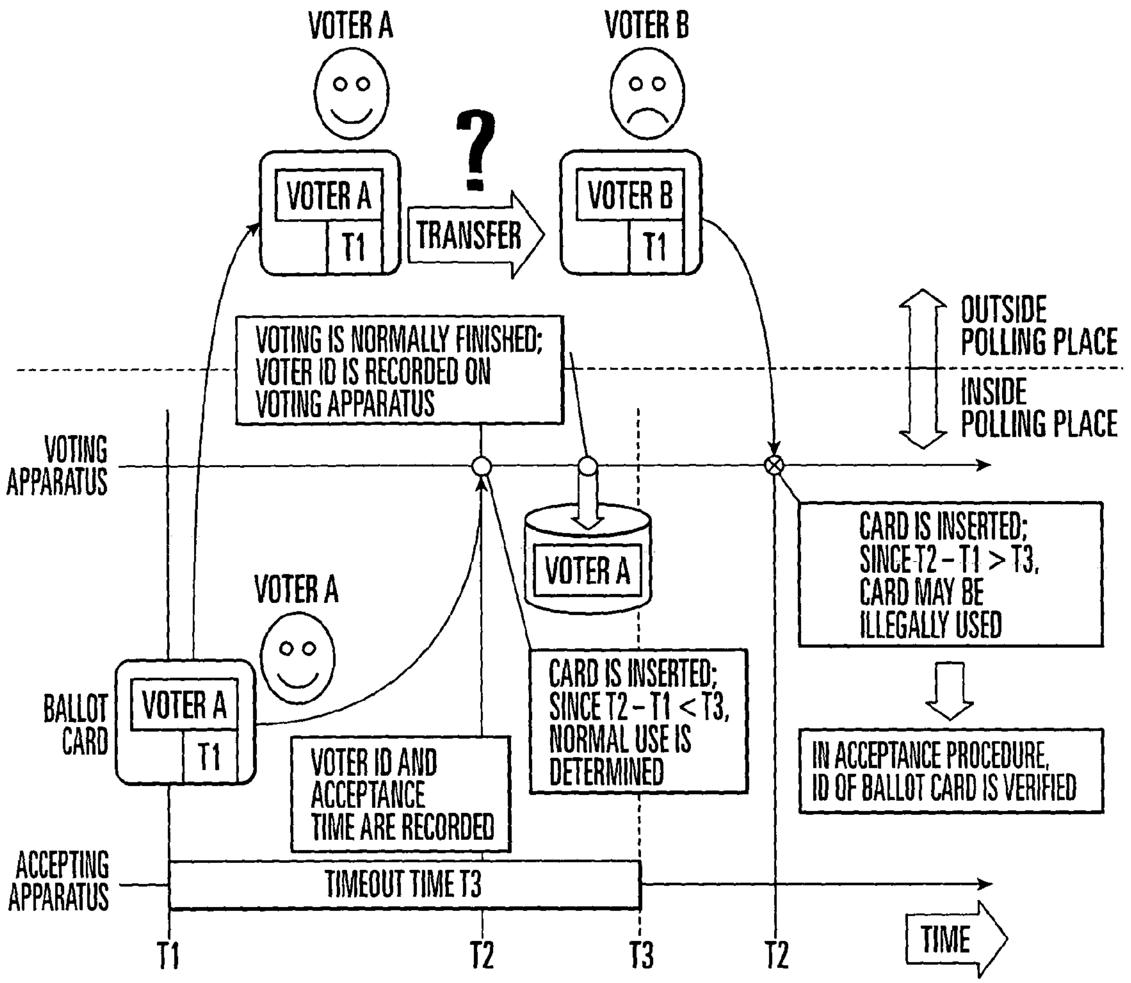
FIGS. 9A and 9B are views schematically showing the first embodiment of the present invention.

Operation in a case wherein the timeout of the ballot card 31 is to be determined will be described with reference to FIG. 9A. Time stamp information "T1" of the acceptance time and the ID of a voter "A" are recorded on the ballot card 31 issued by the accepting apparatus 11.

When the ballot card 31 is inserted into the voting apparatus 21, the voting apparatus 21 reads the time stamp information "T1" of the acceptance time, and calculates the elapsed time until current time "T2". The voting apparatus 21 then checks whether or not the elapsed time is equal to or more than a predetermined timeout time "T3". If "T2−T1<T3", it is determined that the ballot card 31 is normally used, and normal voting processing is performed. When voting is normally finished, the ID of the voter "A" is recorded on the voting apparatus 21.

If "T2−T1>T3", the unauthorized use of the ballot card 31 is suspected, e.g., it is suspected the voter "A" took the ballot card 31 out of the polling space and transferred it to a voter "B", and a corresponding warning message is output. Thereafter, the accepting apparatus 11 collates the voter ID of the voter who is holding the ballot card 31 with the voter ID recorded on the ballot card 31.

Figure 9B:
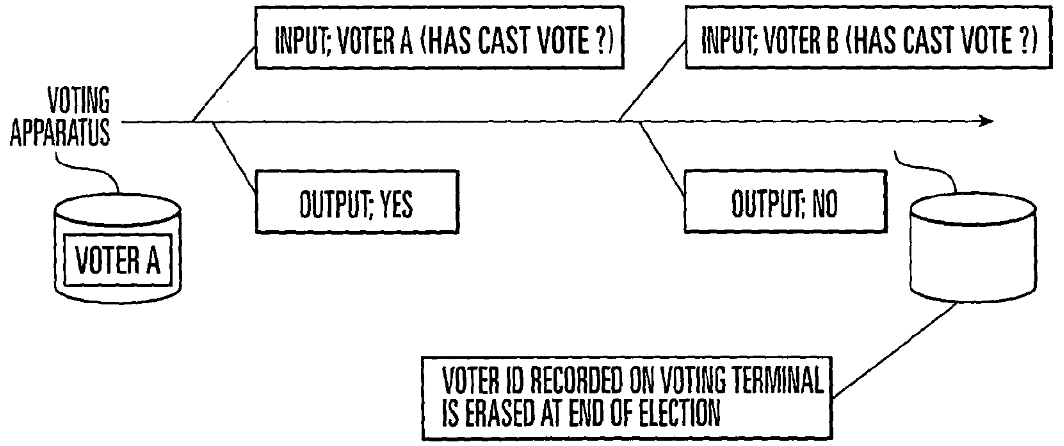

Operation to be performed when it is necessary to check whether a voter has finished voting, e.g., a case wherein after the ballot card 31 is issued, the voter claims that he/she cannot cast a vote because the ballot card 31 is broken (a case wherein it cannot be discriminated whether the card is really broken or the card was intentionally broken) will be described with reference to FIG. 9B.

A voter ID as a search target is input to the voting apparatus 21 to search the set of voter IDs recorded on the voting apparatus 21 for the corresponding voter ID. The search result is then output. The ballot card 31 is reissued only when there is no corresponding voter ID.

Note that the voter ID recorded on the voting apparatus 21 is recorded on an area different from a voting result recording section 30 on which the voting result is recoded. With this operation, by erasing the voter ID recorded on the voter ID list storage section 28 at the end of electronic voting, the relation between this record and the voting result or personal information associated with this record can be concealed.

Figure 10:
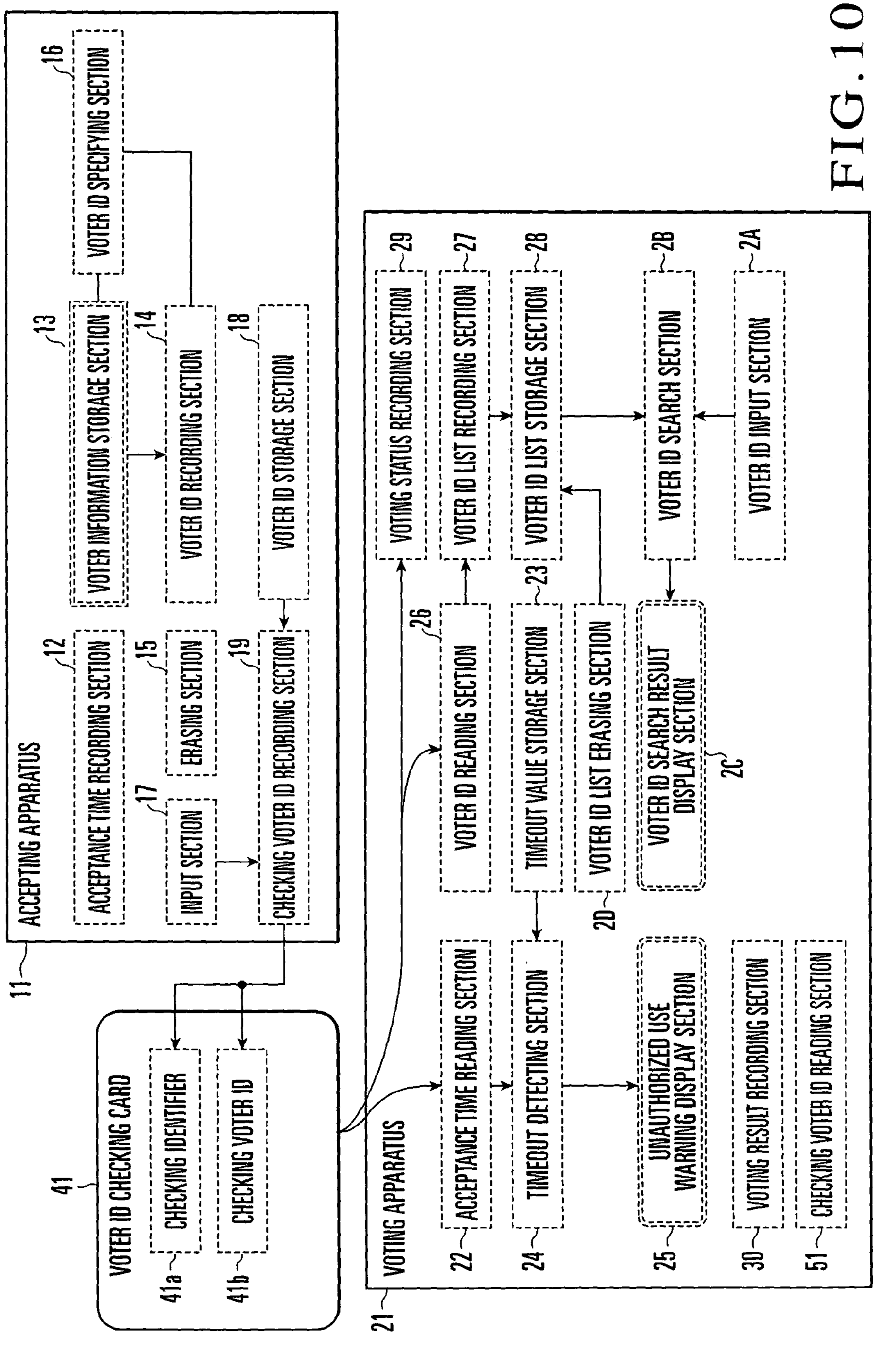
FIG. 10 is a view showing the arrangement of the second embodiment of the present invention.

The second embodiment of the present invention will be described next in detail with reference to FIG. 10.

An electronic voting system of this embodiment provides another method of inputting a voter ID in checking whether or not a voter ID as a search target is stored in a voter ID list storage section 28 of a voting apparatus 21. The remaining arrangements are the same as in the first embodiment.

In the first embodiment, a voter ID is manually input from the touch panel. In the second embodiment, an accepting apparatus 11 issues a voter ID checking card 41 for checking a voter ID, and the card is inserted into the voting apparatus 21 to allow the voting apparatus 21 to recognize the voter ID as a search target.

A checking identifier 41*a* and checking voter ID 41*b* are recoded on the voter ID checking card 41. The checking identifier 41*a* indicates information for identifying the checking card. The checking voter ID 41*b* indicates a voter ID as a search target.

The accepting apparatus 11 also includes an input section 17 for inputting a voter ID, a voter ID storage section 18 for storing the voter ID, and a checking voter ID recording section 19 which is connected to the input section 17 and voter ID storage section 18 and writes at least one of the checking identifier 41*a* and the checking voter ID 41*b* on the voter ID checking card 41.

The voting apparatus 21 further includes a checking voter ID reading section 51 for reading a checking voter ID when the application specific identifier indicating an application, which is recorded on the inserted card and is read therefrom, is the checking identifier 41*a*.

Figure 11:
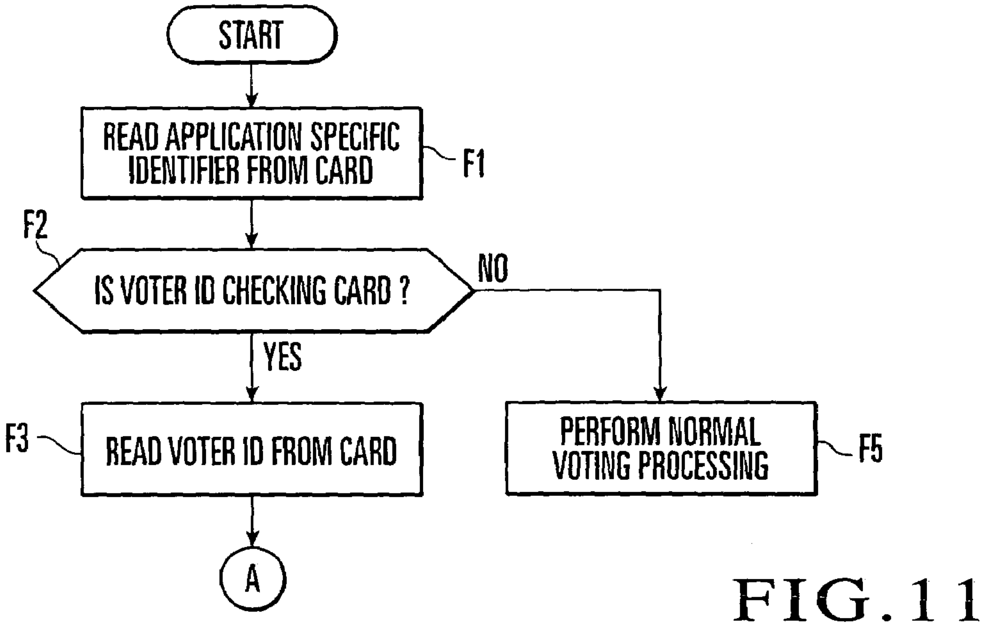
FIG. 11 is a flow chart showing the operation of the second embodiment of the present invention.

As shown in FIG. 11, the voting apparatus 21 reads the application specific identifier of the card from the card (step F1). If this card is not a voter ID checking card (step F2: NO), normal voting processing is performed (step F5). If the card is a voter ID checking card (step F2: YES), a voter ID is read from the card (step F3), and the flow advances to step D2 in FIG. 7, and a voter ID search section 2B searches for the voter ID.

The third embodiment of the present invention will be described in detail next with reference to the accompanying drawings.

Figure 12:
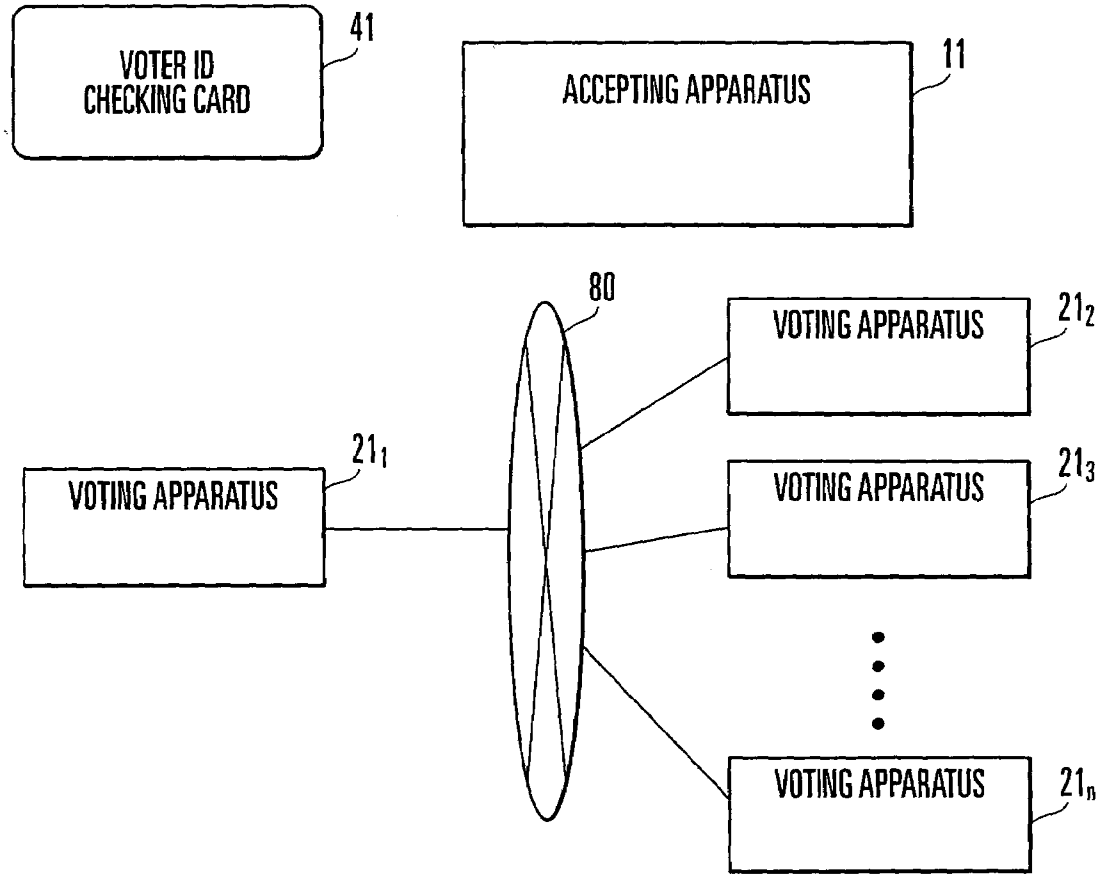
FIG. 12 is a view showing the arrangement of the third embodiment of the present invention.

As shown in FIG. 12, an electronic voting system according to this embodiment has an arrangement in which voting apparatuses $\mathbf{21}_1$ to $\mathbf{21}_n$ are connected through a network 80. Each of the voting apparatuses $\mathbf{21}_1$ to $\mathbf{21}_n$ has the same arrangement as that of the voting apparatus 21 described above.

In this electronic voting system, a voter ID search section 2B of each voting apparatus is designed to return a result with respect to a search request through the network 80. This makes it possible for one voting apparatus to search the voter IDs recorded on all the voting apparatuses.

Figure 13:
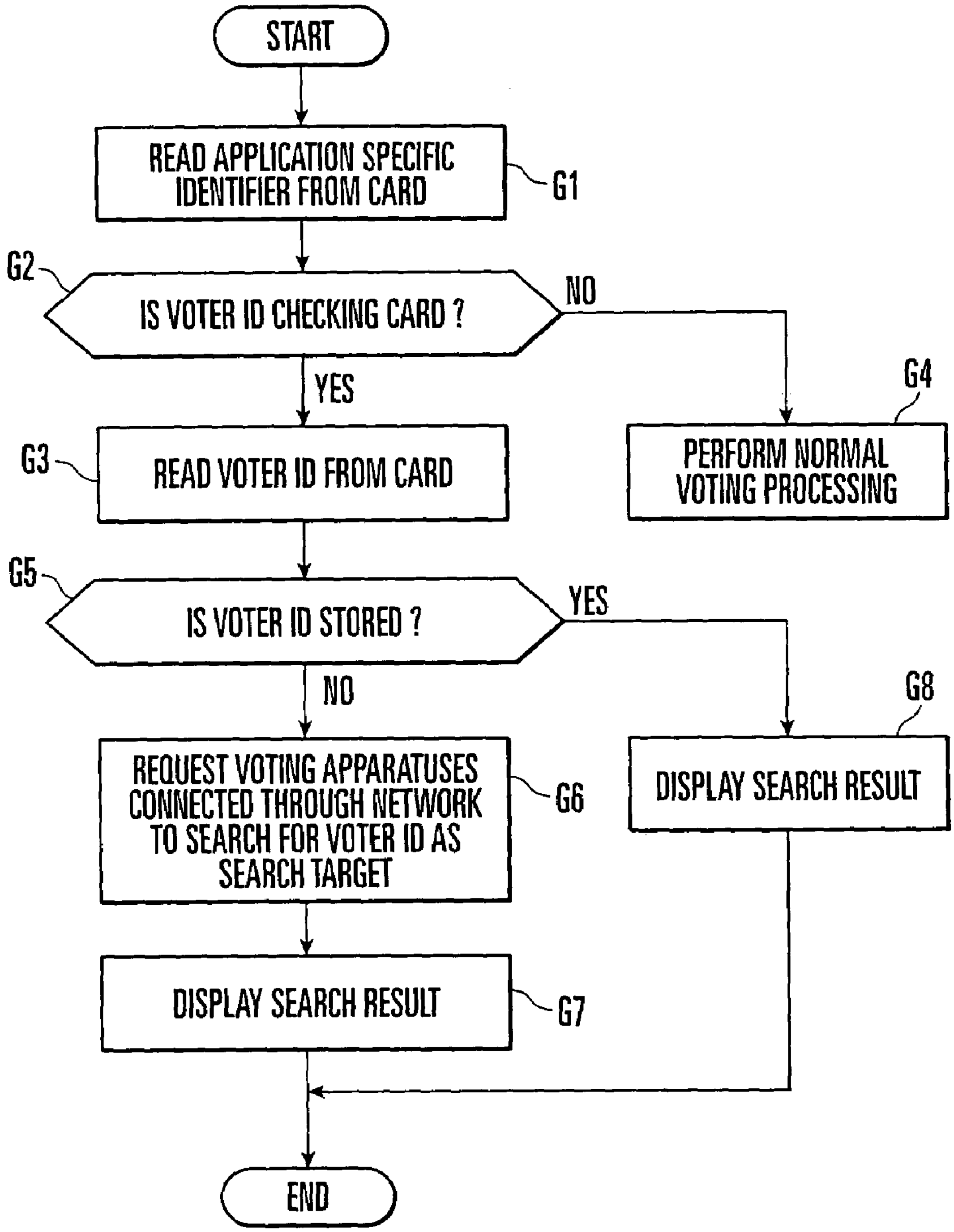
FIG. 13 is a flow chart showing the operation of the third embodiment of the present invention.

The operation of the electronic voting system according to this embodiment will be described next with reference to FIG. 13.

The voting apparatus $\mathbf{21}_1$ reads the application specific identifier of a card therefrom (step G1). If this card is not a voter ID checking card (step G2: NO), normal voting processing is performed (step G4). If the card is a voter ID checking card (step G2: YES), a voter ID is read from the voter ID checking card (step G3).

The voting apparatus $\mathbf{21}_1$ checks whether or not the read voter ID is stored. If the ID is stored (step G5: YES), the voting apparatus $\mathbf{21}_1$ displays the search result (step G8).

If the ID is not stored (step G5: NO), the voting apparatus $\mathbf{21}_1$ transmits the voter ID to each of the voting apparatuses $\mathbf{21}_2$ to $\mathbf{21}_n$ connected through the network 80 to request a search (step G6).

If a search result is returned from any one of the voting apparatuses, the voting apparatus $\mathbf{21}_1$ displays it (step G7). For example, the result is displayed on the voting apparatus which has read the voter ID.

Note that when a voter ID is to be input from a touch panel as in the first embodiment described above, the voting apparatuses $\mathbf{21}_1$ to $\mathbf{21}_n$ are connected through a computer network. Inputting a voter ID as a search target from the touch panel of the voting apparatus 21 makes it possible to search all the voting apparatuses $\mathbf{21}_1$ to $\mathbf{21}_n$.

The voting apparatus $\mathbf{21}_1$ checks whether or not the voter ID is stored. If the voter ID is not stored, the voting apparatus $\mathbf{21}_1$ sends the voter ID to the voting apparatuses $\mathbf{21}_2$ to $\mathbf{21}_n$ to request them to search for the voter ID. When a search result is returned from any one of the voting apparatuses, the voting apparatus $\mathbf{21}_1$ displays it. For example, this result is displayed on the voting apparatus which has read the voter ID.

As has been described above, according to the embodiments of the present invention, the accepting apparatus records the acceptance time on a ballot card. If the elapsed time since the voter inserted the ballot card into the voting apparatus is equal to or more than a predetermined time, a warning is generated. This makes it is possible to prevent the unauthorized use of a ballot card, e.g., temporarily taking the ballot card out of the polling place and transferring it to the third person.

In addition, according to the embodiments, the accepting apparatus records a voter ID on a ballot card. When voting is normally finished, the voter ID is recorded on the voting apparatus to allow a search afterward. This makes it possible to discriminate a case wherein voting could not be done because of a faulty ballot card from a case wherein a voter intentionally broke or lost a ballot card and claims that he/she could not cast a vote, thereby preventing double voting due to unauthorized reissuance of a ballot card.

What is claimed is:

1. An electronic voting system comprising:

a ballot card;

an accepting apparatus which issues a ballot card in accordance with a vote acceptance request; and at least one voting apparatus which performs voting processing in accordance with a vote request using the ballot card, wherein said accepting apparatus includes acceptance time recording means for recording acceptance time on the ballot card when issuing the ballot card, and said voting apparatus includes timeout detecting means for, before performing voting processing upon reception of a vote request, determining whether or not a preset timeout time has elapsed from the acceptance time recorded on the ballot card to the time of voting, and warning display means for outputting a warning message when said timeout detecting means determines that the timeout time has elapsed.

2. A system according to claim 1, wherein said accepting apparatus further comprises voter ID recording means for, when the ballot card is to be issued, recording, on the ballot card, a voter ID indicating information for uniquely identifying the voter who uses the ballot card, and said voting apparatus comprises voter ID list recording means for recording the voter ID recorded on the ballot card as a voter ID list upon completion of voting processing, and voter ID list storage means for storing the voter ID list.

3. A system according to claim 2, wherein said accepting apparatus further comprises voter ID search means for making a search to check whether or not a voter ID as search target is recorded on said voter ID list storage means.

4. A system according to claim 3, wherein said system further comprises a voter ID checking card for checking a voter ID, said accepting apparatus further comprises checking voter ID recording means for recording a voter ID as a search target on said voter ID checking card, and said voting apparatus further comprises checking voter ID reading means for reading a voter ID as a search target from said voter ID checking card.

5. A system according to claim 3, wherein said voting apparatus comprises a plurality of 3 voting apparatuses connected to each other through a network, said plurality of voting apparatuses comprise voter ID list recording means for recording a voter ID, recoded on said ballot card, as voter ID list, and said voter ID search means makes a search through the network to check whether or not a voter ID as a search target is recorded on voter ID list storage means in other voting apparatuses.

6. A system according to claim 2, wherein said voting apparatus further comprises voter ID list erasing means for erasing a voter ID list recorded on said voter ID list storage means.

7. A system according to claim 2, wherein said ballot card comprises an acceptance time recording area on which acceptance time is recorded, and a voter ID recording area on which a voter ID is recorded.

8. A system according to claim 2, wherein said ballot card comprises a voting status recording area on which voting information indicating finished voting is recoded, and said voting apparatus comprises voting status recording means for recording voting information indicating finished voting when voting is normally finished.

9. A system according to claim 8, wherein said accepting apparatus further comprises erasing means for erasing voting information recorded on said voting status recording means.

10. A method of preventing unauthorized use of a ballot card which uses an electronic voting system including an accepting apparatus which issues a ballot card in accordance with a vote acceptance request, and at least one voting apparatus which performs voting processing in accordance with a vote request using the ballot card, comprising the steps of:

recording acceptance time on the ballot card when issuing the ballot card, before performing voting processing upon reception of a vote request, determining whether or not a preset timeout time has elapsed from the acceptance time recorded on the ballot card to the time of voting, and outputting a warning message when a determination is made that the timeout time has elapsed.

11. A method according to claim 10, further comprising the steps of when the ballot card is to be issued, recording, on the ballot card, a voter ID indicating information for uniquely identifying the voter who uses the ballot card, and recording the voter ID recorded on the ballot card as a voter ID list.

12. A method according to claim 11, further comprising the step of making a search to check whether or not a voter ID as a search target is recorded on the voter ID list.

13. A method according to claim 11, further comprising the step of erasing a voter ID list.

14. A method according to claim 11, further comprising the steps of finishing voting processing, recoding a voter ID recorded on the ballot card as a voter ID list, and making a search to check whether or not a voter ID as a search target is recorded on a voter ID list in another voting apparatus through a network.

15. A method according to claim 10, further comprising the steps of recording a voter ID as a search target on a checking card, and reading the voter ID as the search target from the checking card.

16. A method according to claim 10, further comprising the steps of normally finishing voting processing, and recording, on a ballot card, voting information indicating that voting is finished.

17. A method according to claim 16, further comprising the step of erasing voting information recorded on a ballot card.

18. A recording medium recording a program for preventing unauthorized use of a ballot card in an electronic voting system including an accepting apparatus which issues a ballot card in accordance with a vote acceptance request, and at least one voting apparatus which performs voting processing in accordance with a vote request using the ballot card, the program being constituted by a program for executing a procedure for recording an acceptance time on the ballot card when the ballot card is issued, a procedure for, before performing voting processing upon reception of the vote request, determining whether or not a preset timeout time has elapsed from the acceptance time recorded on the ballot card to a time of voting, and a procedure for, when the ballot card is to be issued, recording, on the ballot card, a voter ID which is information for uniquely identifying a voter using the ballot card.

19. A medium according to claim 18, wherein the program further comprises a program for executing a procedure for recording the voter ID as a search target on a checking card.

20. A medium according to claim 18, wherein the program further comprises a program for executing a procedure for outputting a warning message when a determination is made that the preset timeout time has elapsed.

21. A medium according to claim 18, wherein the program further comprises a program for executing a procedure for finishing voting processing, a procedure for recording the voter ID, recorded on the ballot card, as a voter ID list, and a procedure for making a search to check whether the voter ID as a search target is recorded on the voter ID list.

22. A medium according to claim 21, further comprising a program for executing a procedure for erasing the voter ID list.

23. A medium according to claim 21, further comprising a program for executing a procedure for reading the voter ID as a search target from a voter ID checking card.

24. A medium according to claim 18, further comprising programs for executing a procedure for finishing voting processing, a procedure for recording the voter ID, recorded on the ballot card, as a voter ID list, and a procedure for making a search through a network to check whether or not a voter M as a search target is recorded on the voter ID list in another voting apparatus.

* * * * *